June 20, 1972  R. W. JOHNSON  3,671,095
ENCLOSURE FOR HEAT EXCHANGE DEVICE
Filed Aug. 24, 1970  3 Sheets-Sheet 1
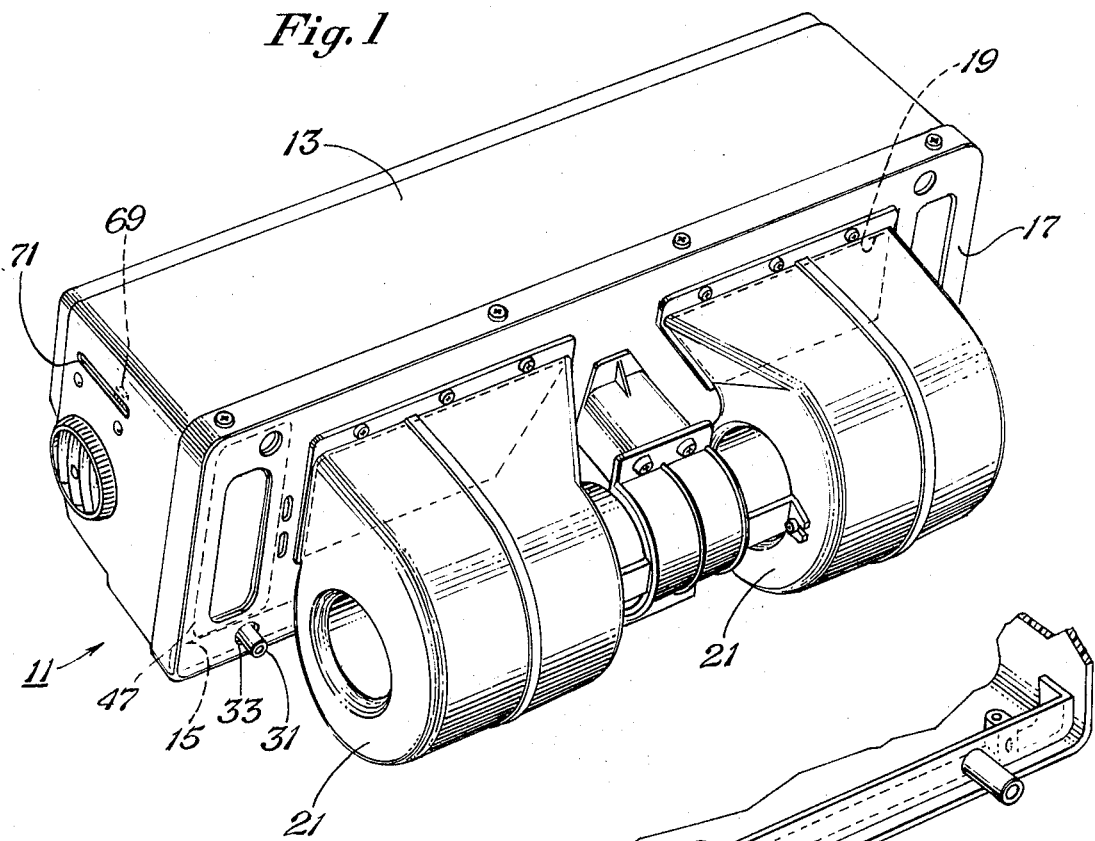
Fig.1
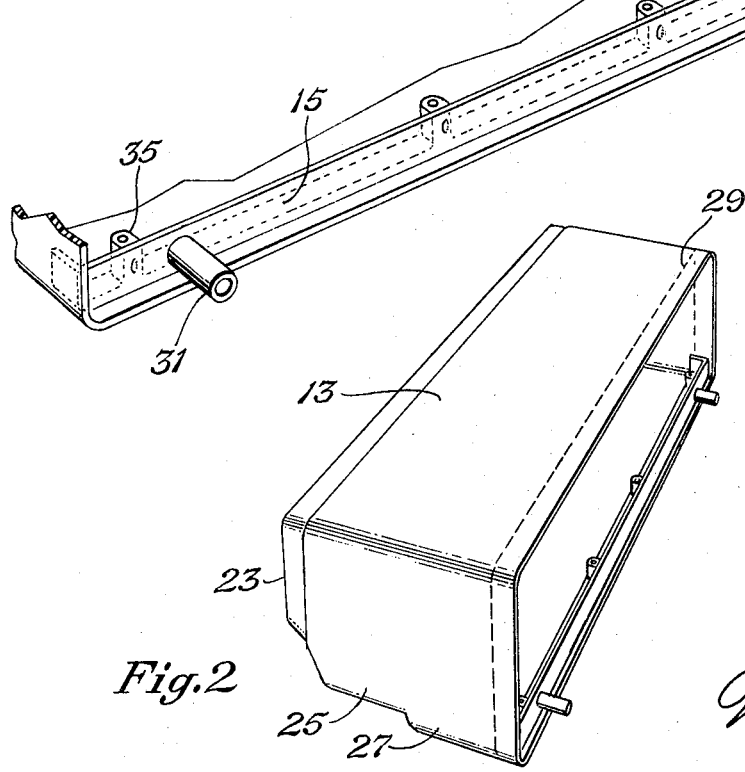
Fig.3
Fig.2
INVENTOR
Randall W. Johnson
BY
Wofford & Felsman
ATTORNEYS United States Patent Office 3,671,095
Patented June 20, 1972

3,671,095
ENCLOSURE FOR HEAT EXCHANGE DEVICE
Randall W. Johnson, 421 Circle View Drive N.,
Hurst, Tex. 76053
Filed Aug. 24, 1970, Ser. No. 66,364
Int. Cl. A47b 77/08
U.S. Cl. 312—352    16 Claims

ABSTRACT OF THE DISCLOSURE

An enclosure for a heat exchange device in which air is blown past a heat exchange coil, characterized by a one-piece coil case having a length longer than any of the heat exchange coils that may be employed with it and readily cut off at an appropriate length to fit the selected heat exchange coil; a dam or seal adapted to be fastened along the bottom rear of the coil case and having a drainage connector for draining condensate from within the coil case, and a removable back plate for connecting with the coil case. The removable back plate has a relatively large aperture for connection with the blower means circulating the air past the heat exchange coil and a plurality of other apertures arranged so that the back plate may be rotated 180° to facilitate most advantageous use of space. Other specific structural features and the method of forming the enclosure are also disclosed.

BACKGROUND OF THE INVENTION (1) Field of the invention

This invention relates to an enclosure employed in circulating air past a heat exchange coil within the enclosure. More particularly, this invention relates to an enclosure for use in an automotive air conditioning distribution system.

(2) Description of the prior art

Many and diverse enclosures have been employed in heat exchange equipment. Most of such structures have not been completely satisfactory for use in heat exchange equipment in an automobile; for example, in an automotive air conditioning distribution system. In the so-called "factory air conditioning system," air conditioning systems emplaced during assembly of the automobile, the ducts may be emplaced peripherially along the wall behind the dashboard of the automobile before the other accoutrements are installed.

There has been a severe problem in obtaining an adequate air distribution system for installation in an automobile after the automobile has been delivered to its owner. In the early days, a plurality of metallic pieces were formed together in conventional sheet metal fashion, employing solder and the like. It rapidly became apparent that the condensation accompanying the cooling of the air caused corrosion and premature failure of such construction. With the advent of successful molding of plastic such as the phenol formaldehyde plastics, an attempt was made to pre-mold, or pre-cast, various elements of the enclosure. Because of the difficulty in attaching the respective elements to the main coil case, there was an increasing attempt to cast fewer components. Proper sizing of the different coil cases to fit the different heat exchange coils continued to present a problem. It has been known in th prior art, however, to employ a plurality of coil cases integrally cast with other elements thereon but split along a horizontal plane or planes. While the problem of fitting the coil case to the respective heat exchange coils continued to plague the industry, the economical manufacture of the enclosures split along a horizontal plane made it possible to store an inventory of different sized enclosures more economically than had been possible theretofore. Such enclosures were bulky, however, and required a large amount of space for storage even though the inventory investment in the respective enclosures themselves were smaller than theretofore. Moreover, it has been found difficult to obtain the degree of flexibility to match blowers with the enclosures and coils needed to do a predetermined air conditioning job, yet within automotive space requirements. It was also difficult to effect sealing along the relatively long lateral joint in the horizontal planes where the two portions of the enclosure were joined together. In addition, plastic enclosures frequently afforded inadequate structural support for the motor and blower housings.

BRIEF DESCRIPTION OF THE DRAWINGS

FIG. 1 is a rear isometric view of an enclosure in accordance with one embodiment of this invention.

FIG. 2 is a rear perspective view of a coil case in accordance with one embodiment of this invention.

FIG. 3 is an isometric view of the damming means employed in one embodiment of this invention.

DESCRIPTION OF PREFERRED EMBODIMENTS

Figure 4:
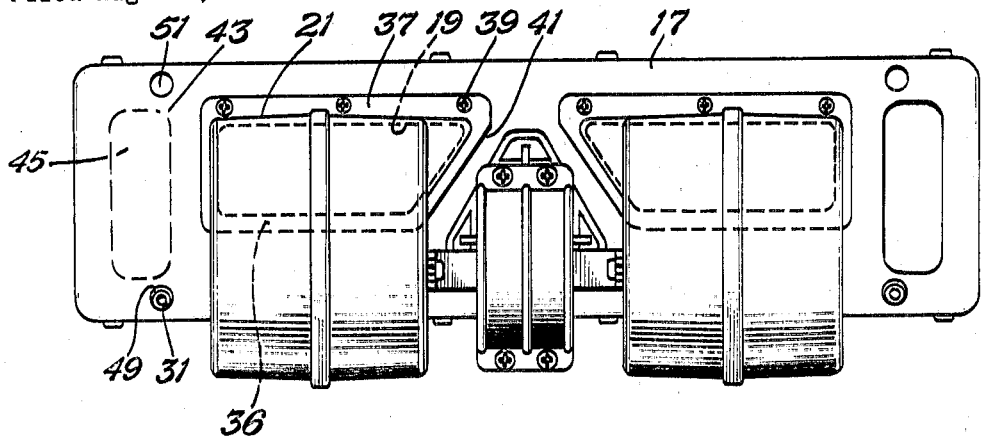
FIG. 4 is an elevational view of the rear of an enclosure, showing the removable back plate, in accordance with one embodiment of this invention.

It is a primary object of this invention to provide a standardized enclosure that alleviates the expense of having to stock a large inventory of separately sized enclosures in accordance with the prior art devices.

It is also an object of this invention to provide a removable back plate on which blower housing and motor supports can be correlatively mounted for providing a back plate structure designed to readily match blower requirements with a given heat exchange coil and do a predetermined air conditioning job; yet provide the motor support and blower housing stronger structural support than the prior art devices.

Referring to FIG. 1, there is illustrated an enclosure 11 for an automotive air conditioner. Such an automotive air conditioner employs one of a plurality of heat exchange coils of standard predetermined cross sectional dimensions, but having a plurality of thicknesses for different cooling jobs. A blower means is employed for circulating air past the heat exchange coil, commonly referred to as evaporator coil in a cooling system. Enclosure 11 has a coil case 13 which has been cut to proper size; has a damming means such as dam 15 sealingly connected along the bottom rear of coil case 13 for collecting and draining off condensate from the evaporator coils; and a removable back plate 17 having a first aperture 19 for connection with a blower means. Blower housing 21 of the blower means is illustrated as being attached to removable rear plate 17 so as to cover first aperture 19.

As illustrated in FIG. 2, coil case 13 is of a unitary, or one-piece, construction. Preferably, coil case 13 is formed of corrosion resistant material; such as thermosetting plastic like phenol formaldehyde copolymer, or thermoplastic material like acrylonitrile-butadiene-styrene copolymer. Coil case 13 has a front section 23 adapted to fit a conventional bezel (not shown); an intermediate plenum 25; and a long rear section 27. Coil case 13 has cross sectional dimensions suitable for receiving the evaporator coil of the standard predetermined cross sectional dimensions but has a predetermined length, extended along rear section 27 longer than the thickness of any of a plurality of evaporator coils with which it will be employed. Thus, as illustrated in FIG. 2, the coil case 13 may be cut to proper length for receiving a given evaporator coil and dam 15 therewithin. On the other hand, for example, coil case 13 could have been fitted for a thinner evaporator coil by being sawed along dashed line 29 by a saw appropriate to cut the material of which the coil case is constructed. The dam would be placed at the bottom rear of the shorter coil case in the latter example, of course. In this way, only one size coil case need be stocked, since the cost of the excess length cut from rear section is minuscule.

Figure 7:
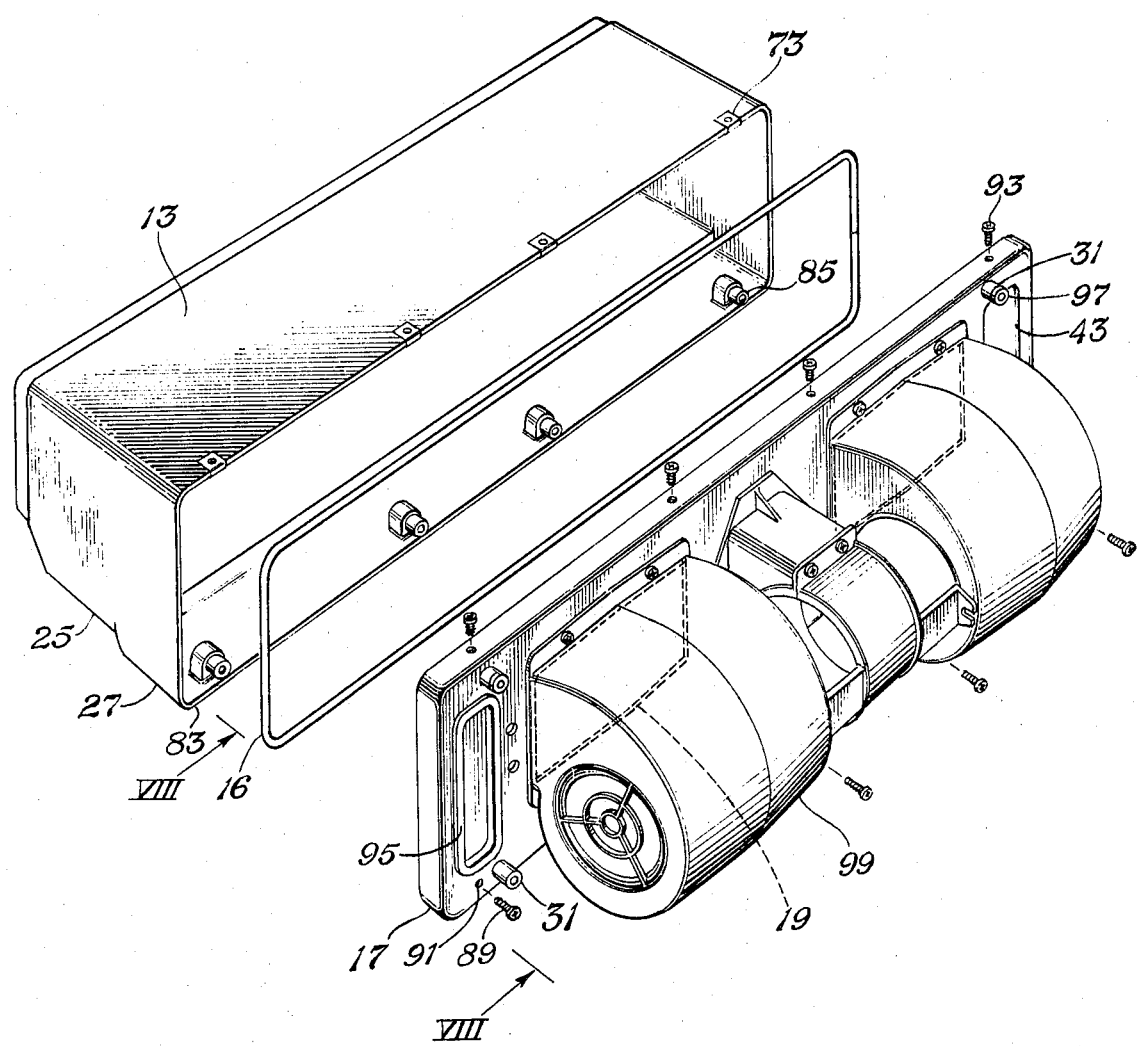
FIG. 7 is an exploded isometric view of another embodiment of this invention.
Figure 8:
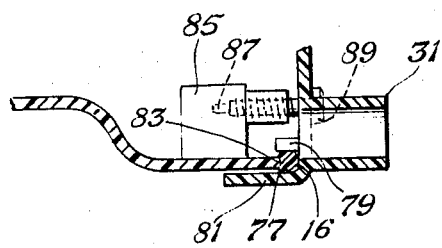
FIG. 8 is a partial sectional view along the line VIII—VIII of FIG. 7 of the damming means effected by assembling the embodiment illustrated therein.

Once the desired length of coil case 13 has been effected, a damming means comprising; for example, a dam 15, FIG. 3, or a seal 16, FIGS. 7 and 8; is fastened in the bottom rear of coil case 13. It is only necessary to stock one size of dams 15 since the cross sectional dimensions of the rear section 27 are uniform and the dam will fit the rear section 27 regardless of the point at which the rear section is cut off. It has been found advantageous to employ the same material to form dam 15 as is employed in coil case 13. For example, when a thermoplastic or thermosetting plastic is employed for coil case 13, dam 15 may be made of the same thermoplastic or thermosetting plastic and adhered thereto, as by a water resistant glue such as an epoxy resin. Dam 15 contains, at its lower extremity, drainage connector means 31. As illustrated, drainage connector means 31 may be a short length of conduit penetrating through an aperture in dam 15 and facilitating connection of a conduit means such as a drainage hose. Alternatively, aperture 33, FIG. 1, may be employed as the drainage connector means and a conduit sealingly inserted therewithin without the use of the short conduit illustrated. While only a single drainage connector means 31 may be employed and be adequate, less likelihood of stopping of the drainage to the outside of the car is effected by having two or more drainage connector means to drain the condensate from within coil case 13. Dam 15 has an L-shaped cross section to add rigidity to the bottom of the rear section 27. Moreover, it has been found advantageous to employ reinforced receiving elements 35 into which screws or other fastening means can be inserted to hold removable rear plate 17 in place on rear section 27 of coil case 13.

Removable back plate 17 may be standardized but readily combinable with accessories to be affixed thereto or passed therethrough. Removable back plate 17, FIGS. 1 and 4 as indicated, has first aperture 19 to which is connected blower housing 21. Blower housing 21 may be connected by any suitable means, as by bonding with a suitable glue such as the forementioned epoxy resin or it may use the epoxy resin in conjunction with other suitable means. For example, an internal lip 36 on blower housing 21 may be inserted through aperture 19 and downwardly over the interior of back plate 17 and the top edge 37 brought into position contiguous with back plate 17 and suitably fastened as by screws 39. Side edges 41 may be flush with the edges of the aperture, with or without additional bonding.

Additionally, back plate 17 has second apertures 43, one at each end, through which conduits can pass for connection with the evaporator coil within coil case 13. Having a second aperture at each end allows the back plate to accommodate evaporator coils with either right hand connections, left hand connections, or one of each; and, also, allows the back plate to be inverted, or rotated 180°, to best utilize the space available, as described in more detail hereinafter with respect to FIGS. 6a and 6b.

For added flexibility second apertures 43 are larger than any conduit to be connected to the evaporator coil. If desired, second apertures 43 may be only partially cut through so as to constitute a provisional blocking panel formed therein, but which can be removed therefrom by pressing. On the other hand, second apertures 43 can be formed completely and a supplemental blocking panel can be employed to block the second aperture that is not used. Expressed otherwise, the second aperture at only one end of back plate 17 may be employed in connecting conduit to the evaporator coils. The other second aperture will be blocked by a blocking panel. Additionlly, a blocking panel that more closely fits the conduit in the second aperture through which the conduits pass may also be employed, if desired, to prevent any flow of air from within the plenum defined by the back plate and coil case. A provisional blocking panel 45 that can be pressed from second aperture 43 is illustrated in FIG. 4. On the other hand, a blocking panel 47 is illustrated in FIG. 1 emplaced over apertures not being employed. The blocking panels employed may be held in place by suitable means, such as screws or glue.

Back plate 17 also has third apertures 49 for the drainage connector means 31, or a drainage connector means and its associated conduit as described hereinbefore. In order to provide the full range of flexibility, indicated hereinbefore with respect to the second aperture 43, back plate 17 preferably has four third apertures, one each at the top and bottom of each end. In this way back plate 17 can be inverted as will be described in more detail hereinafter without requiring any supplemental apertures for drainage connector means 31. A blocking panel means is employed for blocking the flow of air out the third apertures that are not suitably blocked by drainage connector means 31. As illustrated in FIG. 4 a provisional blocking panel 51 may be employed by having cuts only partially defining the third apertures with panels 51 removable by pressing to complete the third apertures needed. On the other hand, a blocking panel such as blocking panel 47 in FIG. 1 may be employed.

Figure 5:
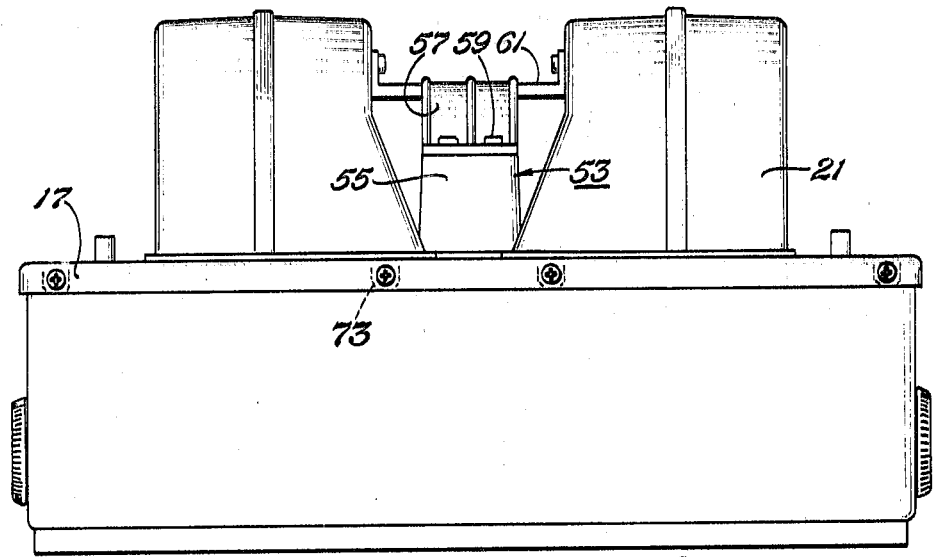
FIG. 5 is a plan view from the top of the enclosure in accordance with one embodiment of this invention.

As illustrated in FIG. 5, the blower means that is attached to removable rear plate 17 comprises a blower housing 21 and a motor support 53. A predetermined blower housing 21 may be attached as indicated hereinbefore and motor support 53 properly aligned therewith after the blower housing has been suitably mounted on rear plate 17. Specifically, blower housing 21 will house a blower fan that is powered by a motor so the motor must be aligned with the fan; for example, by way of a shaft, and the motor support must be properly placed on rear plate 17 to align the motor with a predetermined blower that will be employed to do a particular heat exchange job. Consequently, as larger or smaller blowers are employed, having different capacity of air circulation, motor support 53 may have to be moved upwardly or downwardly on rear plate 17 to properly align with the blower. The present inventive structure is advantageous in that a broad base 55 can be attached to rear plate 17 for greater structural support for the motor to be emplaced therein. For example, if base 55 is to be adhered to back plate 17 by an adhesive, a much larger area is available for adhesion and, hence, the stress concentration per unit area is much lower than in prior art devices. Motor support 53 also has an outer cover 57 that is connectable to base 55 as by threaded screws 59. Outer cover 57 is also connectable with blower housing 21 via connection member 61 that has a dimension greater in the plane parallel with the plane of back plate 17 than in the plane perpendicular thereto. In this way greater structural support is effected between outer cover 57 and blower housing 21, without large, space-consuming brace members.

Figure 6A:
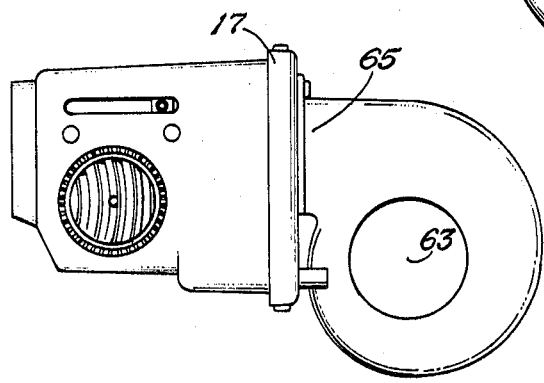
FIG. 6a is a side elevational view illustrating a blower housing in a "normal" position.
Figure 6B:
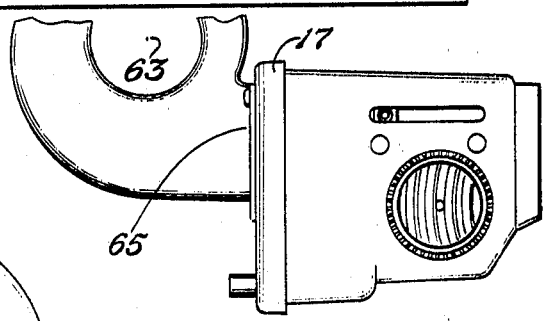
FIG. 6b is a side elevational view showing the blower housing in an "inverted" position; each in accordance with an embodiment of this invention.

Blower housing 21 may be mounted on rear plate 17 and plate 17 positioned with the housing center 63 below the eccentric portion 65, as shown in FIG. 6a. Ordinarily, the blower housing will be mounted in this position, but one meritorious aspect of this invention is that removable back plate 17 is also reversible in that it may be inverted, as illustrated in FIG. 6b to most advantageously employ the space available in an automobile for installation of the air distribution system. Expressed otherwise, in FIG. 6b, rear plate 17 is positioned so that housing center 63 is in the inverted position, or above eccentric portion 65.

The blower means will ordinarily be correlatively sized with the evaporator coil for doing a predetermined cooling job. Different capacity blowers may be effected by employing different sized blower housings with a given number of blower fans. A single blower means employing a single blower housing and fan may be employed if desired. Large single blowers require large housing and occupy a relatively large space. A plurality of blower housings; for example, two blowers and blower housings; may be employed on both sides of a motor in the motor support such that the single motor may drive both blowers for increased capacity without a large diameter blower housing. A given aperture 19 may be employed with a variety of blowers and housings allowing advantageous flexibility. Even so, widely different flow rates and different size blower housings may require different size apertures through which to discharge the air and flow it past the evaporating coil within the enclosure. The sizes of the apertures in back plate 17 are readily and easily varied. For example, the smaller sized apertures 19 such as are illustrated in FIG. 7, may be readily enlarged to those illustrated in FIG. 4 to accommodate larger blower housings. Fan sizing has become relatively standardized and does not require detailed description herein. It enables stocking standard blower housings and matched cooling coils.

If desired, a plurality of back plates may be stocked; already having attached blower means of predetermined sizes, with the blower housing and apertures properly sized in accordance with engineering principles and the motor support properly positioned.

In operation, the one-piece coil case having the length greater than thickness of any of the evaporator coils with which it will be employed is formed, as by molding of plastic. The evaporator coil to do the given job of cooling is chosen and the coil case is sized by cutting it off at an appropriate length to house the selected evaporator coil. The evaporator coil is emplaced in the coil case and appropriately braced; for example, by having its support brace attached to an adjustable nut 69, adjacent slot 71 in case 13, FIG. 1. Dam 15 is adhered along the bottom rear of the coil case with the drainage connector means for draining condensate that will collect therein.

A back plate is selected from a plurality of back plates and connected along the rear of the coil case. If desired, supplemental, U-shaped metallic fasteners 73 may be slipped over the rear edge to reinforce apertures through the coil case for fastening the back plate by screws. Other means of fastening the back plate to the case may be employed.

Each of the plurality of back plates will have been formed with the desired first, second and third apertures therein. A blower housing for the blower means appropriate to a predetermined aperture therefor and the blower means are selected as indicated hereinbefore and the blower housing attached. After the blower housing has been attached, the broad base of the motor support is attached to the rear plate 17, as by adhesively bonding the motor support in proper alignment with the blower housing. The outer cover is fastened to the base of the motor support and to the blower housing via its support member after the blower fan and the motor are emplaced.

The appropriate connections of conduit means, through the respective apertures in back plate 17 are made, rear plate 17 is attached to coil case 13 and the resulting unit suspended at an appropriate location in the automobile; for example, beneath the dashboard. The final touches such as emplacement of the bezel, and appropriate louvers may be made before or after mounting in the automobile. The proper connection to the compressor and condenser is performed in the conventional manner and the unit is ready to be operated with conventional controls properly connected.

Another embodiment of this invention is illustrated in FIG. 7. Therein coil case 13 has its rear section 27 cut off near the front end thereof, closely adjacent plenum 25 for accommodating a relatively thin evaporator coil and a light cooling job, as for the cab of a pick-up truck. Otherwise, the structure is the same as illustrated in FIG. 2 forward of the point at which rear section 25 is cut off. The damming means in FIG. 7 is formed, however, by seal 16 which is emplaced within grooves in removable rear plate 17 such that when rear plate 17 is affixed to case 13, a waterproof seal is provided at the bottom of rear section 27, as illustrated in FIG. 8. Specifically, a groove 77 is defined by ridge 79 adjacent the external frame 81 of rear plate 17. Seal 16 is emplaced therein and brought into sealing contact with the edge 83 of rear section 27 of coil case 13. Bosses 85 are affixed, as by adhering with a waterproof glue, to the bottom of rear section 27. Bosses 85 have suitable threaded apertures 87 for receiving screws therein. Screws 89 are then inserted through appropriate apertures such as apertures 91 having their axis parallel with the axis of coil case 13 and screwed into the threaded aperture 87 for applying the requisite compressional force on seal 16 to retain it in sealing engagement with edge 83. Movable back plate 17 may be fastened at the top as described hereinbefore, employing suitable screws 93 and U-shaped metallic fasteners 73, since the seal is not so critical at the top of rear section 27.

As illustrated in FIG. 7, four drainage connector means 31 are employed in removable rear plate 17. Drainage connector means 31 comprise short cylindrical sections of plastic material affixed, as by adhesion into conforming apertures in removable rear plate 17. Drainage connector means 31, are connected with the exterior of the car with suitable hose for drainage of condensate from rear section 27 to the exterior of the car. As illustrated, the right hand second aperture 43 will be employed for connection of the condenser with the evaporator coil and the evaporator coil with the compressor; whereas, left aperture 43 will be plugged by a suitable blocking panel 95 inserted from the exterior and having its flange glued with the rear of removable rear plate 17. This illustrates another widely useful type of rear plate and a method of affixing it. Similarly, the two upper drainage connector means 31 are plugged by insertion of a suitable plug 97 serving as a blocking panel. The plug 97 is also adhered to the unused drainage connector means 31.

Also noteworthy in connection with FIG. 7 is the relatively small blower housing 99 employed in conjunction with the small coil case. Accordingly, relatively small apertures 19 will be required. These relatively small apertures 19 may still take two sizes larger or smaller blower housing without requiring any change. Moreover, as indicated hereinbefore, if a larger aperture is required for a larger blower such as illustrated in FIG. 4, the apertures 19 may be readily cut to form the larger apertures required.

The operation of the embodiment illustrated in FIGS. 7 and 8 is essentially the same as described hereinbefore with FIGS. 1–6b except for the structural variations delineated hereinbefore with respect to FIGS. 7 and 8.

As described hereinbefore, the damming means may comprise a physical dam such as dam 15 or a suitable sealing means such as formed by seal 16 sealingly emplaced contiguous edge 85 by removable back plate 17. Any other damming means may be employed that will effect a water-tight seal along the bottom rear of rear section 27 and allow drainage off of condensate via appropriate connector means 31. It is only necessary to stock one size of the seals 16, since the cross sectional dimensions of rear section 27 are the same regardless at what point it is cut off to fit the evaporator coil.

Thus, it can be seen that the invention provides an enclosure that is particularly useful in an automotive air conditioning system and which alleviates the problems of the prior art devices and accomplishes the objects delineated hereinbefore.

Although the invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. An enclosure for heat exchange devices employing one of a plurality of heat exchange coils of standard predetermined cross sectional dimensions and having a plurality of thicknesses, and blower means for circulating air therepast comprising:
    (a) an integrally formed coil case of unitary construction adapted to receive one of said heat exchange coils, said coil case having a predetermined length greater than the thickness of any of said heat exchange coils and adapted to be readily cut off at an appropriate length to fit said one heat exchange coil;
    (b) a damming means adapted to sealingly engage the bottom rear portion of said coil case after said coil case has been cut off to size, said damming means having disposed in conjunction therewith at least one drainage connector means for draining condensate from within said coil case; and
    (c) a removable back plate for connecting with said coil case, said removable back plate having an aperture for connection with said blower means.

2. The enclosure of claim 1 wherein said damming means comprises a dam adapted to fit conformingly along the bottom rear of the cut-to-size coil case and said drainage connector means comprises a fluid passageway through said dam.

3. The enclosure of claim 2 wherein said removable back plate has a second aperture for conduits to be connected with said heat exchange coil, and a third aperture for conduits to be connected with said drainage connector means.

4. The enclosure of claim 3 wherein said removable back plate has two said second apertures, one at each end and larger than said conduits passing therethrough and at least one blocking panel means is employed for blocking the flow of air through said second apertures not otherwise blocked by said conduits when said removable back plate is connected with said coil case.

5. The enclosure of claim 4 wherein said removable back plate has four said third apertures, two at each end, and a blocking panel means is employed for blocking flow of air through said third apertures not otherwise blocked by said drainage connector means.

6. The enclosure of claim 1 wherein said damming means comprises a seal means adapted to sealingly engage the bottom rear portion of the cut-to-size coil case and the internal surface of said removable back plate and said drainage connector means comprises a fluid passageway through the lower portion of said removable back plate and slightly interior of said internal surface that is to engage said seal means so as to drain off said condensate.

7. The enclosure of claim 6 wherein said drainage connector means comprises a short tubular element defining said fluid passageway through said removable back plate.

8. The enclosure of claim 7 wherein there are four said drainage connector means, one at each corner of said removable back plate, and the top two drainage ing air flow therefrom, and the bottom two said drainage connector means are covered by a suitable plug for blocking air flow therefrom, and the bottom two said drainage connector means are unplugged for connection with the exterior of the automobile.

9. The enclosure of claim 1 wherein said blower means are mounted on said removable back plate.

10. The enclosure of claim 9 wherein said blower means comprises a pre-formed blower housing for housing a blower fan and motor support for housing a motor aligned with said blower fan, said blower housing being connected to said removable back plate at an eccentric portion of said housing and said motor support being connected to said removable back plate and to said blower housing.

11. The enclosure of claim 6 wherein said motor support has a broad unitary base that is connected to said removable back plate and an outer cover that is connectable with said base and via a connecting member that has a dimension parallel with said removable back plate that is greater than the dimension perpendicular to said removable back plate for greater structural support with said blower housing.

12. The enclosure of claim 7 wherein said motor support is connected to said removable back plate after said blower housing is positioned at its required position.

13. The enclosure of claim 7 wherein said base is adhered to said removable back plate over a relatively large area to effect minimal stress at the area of adhesion.

14. The enclosure of claim 6 wherein said back plate is adapted to be reversibly connected with said coil case such that said blower housing center is either below said eccentric portion or above said eccentric portion as required to most advantageously employ the space available in an automobile in which said enclosure is mounted.

15. The enclosure of claim 6 wherein a plurality of said blower housings are employed, one on each side of and aligned with said motor support whereby a single motor in said motor support can drive a plurality of blowers in respective blower housings.

16. The enclosure of claim 10 wherein a plurality of back plates having predetermined size of blower means and apertures therefor are provided and a predetermined one of said back plates is employed in correlation with said one heat exchange coil for performing a predetermined heat exchange job.

References Cited
UNITED STATES PATENTS

| | | | |
|---|---|---|---|
| 2,824,427 | 2/1958 | Baker | 62—244 |
| 3,381,492 | 5/1968 | Dixon | 62—239 X |
| 3,489,477 | 1/1970 | Harder, Jr. | 312—236 X |
| 3,514,333 | 5/1970 | Novack | 220—46 R |
| 3,520,581 | 7/1970 | Borghi | 312—236 |

JAMES T. McCALL, Primary Examiner

U.S. Cl. X.R.

220—46; 312—236